United States Patent
Ricco et al.

(12) 
(10) Patent No.: US 11,629,654 B2
(45) Date of Patent: Apr. 18, 2023

(54) INTERNAL COMBUSTION ENGINE WITH FAST COMBUSTION, AND METHOD FOR THE INTERNAL COMBUSTION ENGINE

(71) Applicant: C.R.F. Società Consortile per Azioni, Orbassano (IT)

(72) Inventors: Raffaele Ricco, Orbassano (IT); Sergio Stucchi, Orbassano (IT); Marcello Gargano, Orbassano (IT); Onofrio De Michele, Orbassano (IT); Chiara Altamura, Orbassano (IT)

(73) Assignee: C.R.F. SOCIETÀ CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 17/651,139

(22) Filed: Feb. 15, 2022

(65) Prior Publication Data

US 2022/0260025 A1    Aug. 18, 2022

(30) Foreign Application Priority Data

Feb. 16, 2021    (EP) .................................... 21157310

(51) Int. Cl.
*F02D 13/02* (2006.01)
*F01L 9/20* (2021.01)
(Continued)

(52) U.S. Cl.
CPC .......... *F02D 13/0226* (2013.01); *F01L 1/047* (2013.01); *F01L 1/14* (2013.01);
(Continued)

(58) Field of Classification Search
CPC ............ F02D 13/0226; F02D 2200/101; F01L 1/047; F01L 1/14; F01L 9/10; F01L 9/20; F02F 1/4235
See application file for complete search history.

(56) References Cited

U.S. PATENT DOCUMENTS 7,017,539 B2   3/2006   Lewis et al.
7,079,935 B2   7/2006   Lewis et al.
(Continued)

FOREIGN PATENT DOCUMENTS

EP   0803642 B1   11/2000
EP   1555398 B1    2/2007
(Continued)

OTHER PUBLICATIONS

European Search Report dated Jul. 23, 2021, 3 pp.

*Primary Examiner* — Grant Moubry
(74) *Attorney, Agent, or Firm* — Heslin Rothenberg Farley & Mesiti P.C.; Victor A. Cardona, Esq.

(57) ABSTRACT

An engine includes at least one cylinder, a first intake valve and a second intake valve associated with the cylinder, to control a flow of intake air from a first intake duct and a second intake duct, respectively. The two intake ducts communicate with a common intake manifold, so as to receive air at the same pressure. During the intake stage, in each cylinder operating cycle, initially an opening and closing movement of only the first intake valve is activated, while the second intake valve remains closed and, subsequently, an opening and closing movement of only said second intake valve is activated, while the first intake valve remains closed. In this way, the two air flows at the same pressure entering the cylinder give rise to a high turbulent kinetic energy, to the advantage of combustion efficiency and reduction of harmful exhaust emissions.

21 Claims, 8 Drawing Sheets

(51) Int. Cl.
     *F01L 9/10*           (2021.01)
     *F01L 1/047*         (2006.01)
     *F01L 1/14*           (2006.01)
     *F02F 1/42*           (2006.01)

(52) U.S. Cl.
     CPC ............... *F01L 9/10* (2021.01); *F01L 9/20* (2021.01); *F02F 1/4235* (2013.01); *F02D 2200/101* (2013.01)

(56) References Cited

U.S. PATENT DOCUMENTS

| | | | | |
|---|---|---|---|---|
| 8,061,318 | B2* | 11/2011 | Cleary | F02D 13/0257 |
| | | | | 123/90.31 |
| 8,590,507 | B2* | 11/2013 | Marriott | F02D 41/1497 |
| | | | | 123/406.12 |
| 8,763,582 | B2* | 7/2014 | Lewis | F02N 11/08 |
| | | | | 123/179.5 |
| 2005/0205037 | A1 | 9/2005 | Lewis et al. | |
| 2006/0266312 | A1 | 11/2006 | Lucatello | |
| 2018/0171913 | A1* | 6/2018 | Ulrey | F02M 35/104 |
| 2019/0101065 | A1* | 4/2019 | Aoyagi | F02D 41/0065 |

FOREIGN PATENT DOCUMENTS

| | | | |
|---|---|---|---|
| EP | 1674673 | B1 | 3/2007 |
| EP | 1508676 | B1 | 2/2008 |
| EP | 2261471 | B1 | 9/2014 |
| EP | 2801706 | A1 | 11/2014 |
| EP | 2693007 | B1 | 12/2015 |
| FR | 3064676 | A1 | 10/2018 |

\* cited by examiner

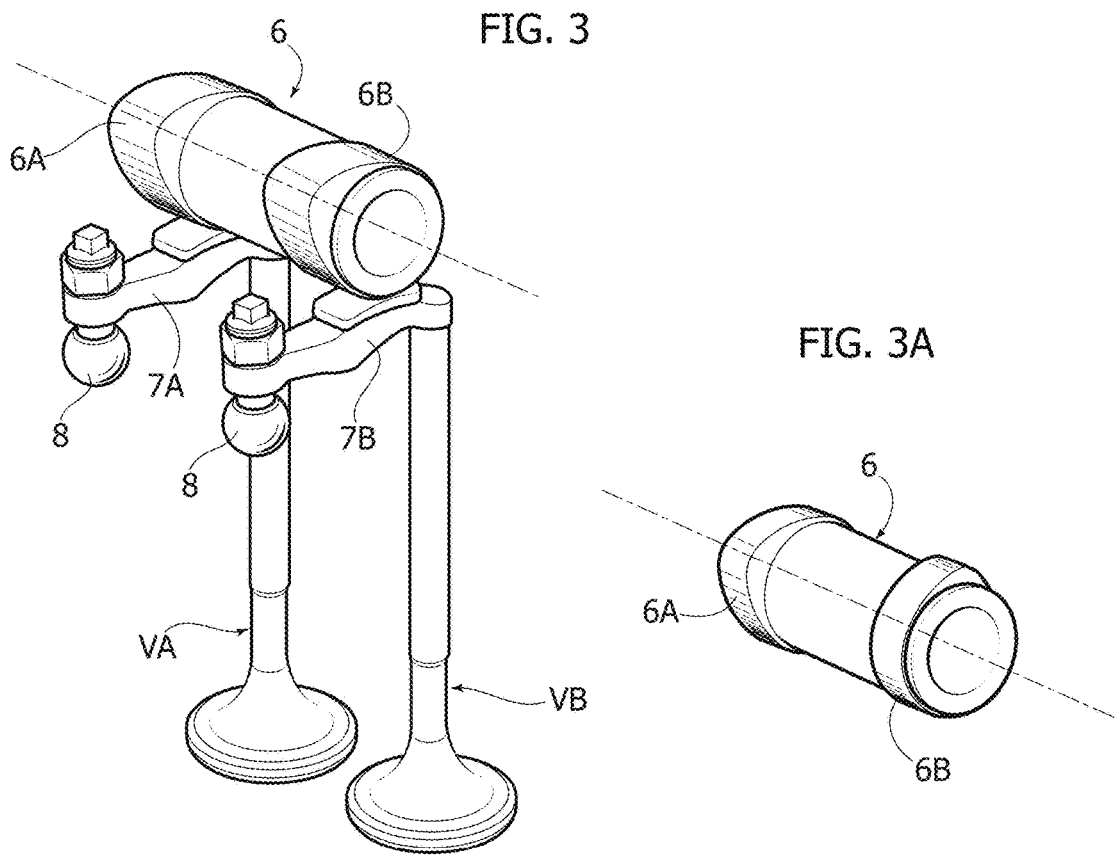
FIG. 3
FIG. 3A
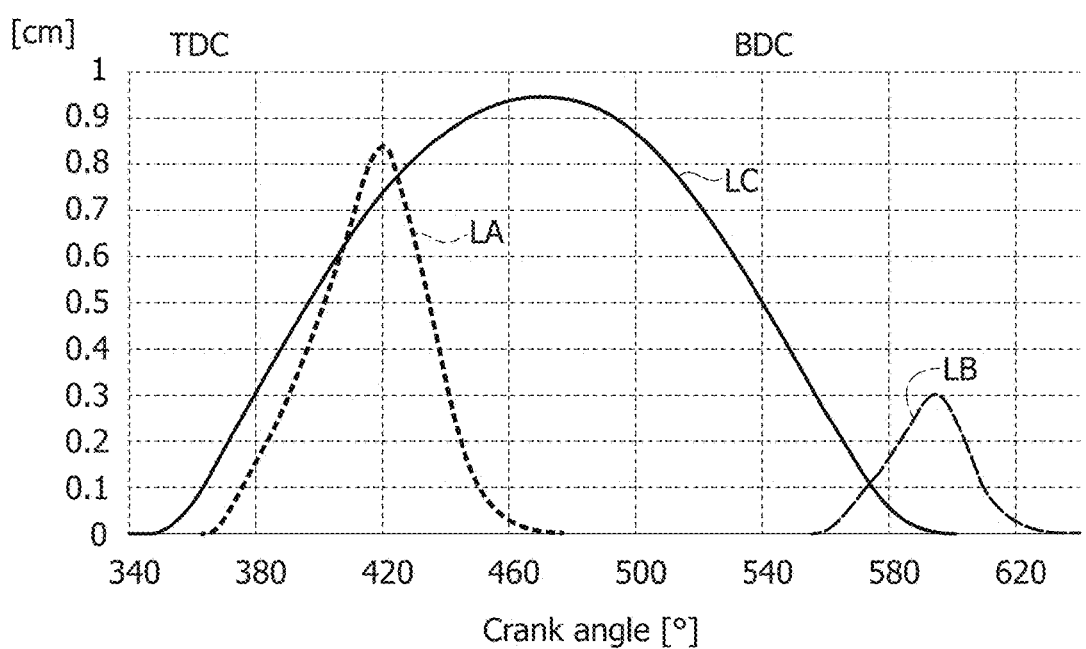
FIG. 4

INTERNAL COMBUSTION ENGINE WITH FAST COMBUSTION, AND METHOD FOR THE INTERNAL COMBUSTION ENGINE

CROSS REFERENCE TO RELATED APPLICATIONS

This application claims priority from European Patent Application No. 21157310.0 filed on Feb. 16, 2021, the entire disclosure of which is incorporated herein by reference.

FIELD OF THE INVENTION

The present invention relates to internal combustion engines, of the type comprising one or more cylinders and respective pistons slidable in the cylinders between a TDC and a BDC, and operatively connected to a crankshaft, with a sequence of intake, compression, expansion and discharge stages during each operating cycle in each cylinder. In particular, the invention refers to engines of the type comprising, for each cylinder:
- a first intake duct and a second intake duct opening into the cylinder in spaced apart positions and both communicating with the same intake manifold, so as to receive air at the same pressure,
- a first intake valve and a second intake valve associated with the cylinder, to control entering of a flow of intake air into the cylinder from the first intake duct and the second intake duct, respectively, during the intake stage in each operating cycle of the cylinder, and
- a device for actuating said first intake valve and said second intake valve, to control, during the intake stage in each operating cycle of the cylinder, an opening movement and a subsequent closing movement of said first intake valve and said second intake valve.

The invention is generally applicable to an internal combustion engine of any type, for example, petrol or diesel. The device for actuating the intake valves can also be of any type, and—in particular—it can be either a conventional device that controls the intake valves with fixed and rigid times and displacements, or a variable actuation device of any known type, configured to vary the moments of opening and/or closing and/or the lifting of the intake valves as the operating conditions of the engine vary.

PRIOR ART

The increasingly severe regulations in relation to $CO_2$ emissions and particulate matter in gasoline and diesel internal combustion engines, have pushed the designers towards a series of measures (such as, for example, high compression ratio engines, engines operating according to the Miller-Atkinson cycle, dilution of the air-petrol mixture with recirculation of cooled exhaust gases or with excess air, direct injection of fuel at high pressure, deactivation of one or more engine cylinders) which, however, introduce new problems regarding the maximum power per displacement unit, the homogeneity of the mixture consisting of air, fuel and, if present, exhaust gas recirculation (EGR) and the formation of particulate matter, associated with the quality of the fuel injector spray.

In view of overcoming these drawbacks, the Applicant has already proposed various engine solutions aimed at obtaining a high Turbulent Kinetic Energy (TKE) of the air charge inside the cylinder, to obtain a more rapid combustion propagation (see, for example, European application EP 20 214 913 filed on 17 Dec. 2020 and still secret at the priority date of the present invention).

However, the need is still felt for internal combustion engines with rapid combustion and high efficiency, which can still have an extremely simple configuration and, if desired, also adopt simplified drive systems for the intake valves.

OBJECT OF THE INVENTION

The object of the present invention is, therefore, to propose an innovative solution for an internal combustion engine which is characterized—at the same time—by a high operating efficiency and by an extremely simple construction.

Another particular object of the invention is to propose an internal combustion engine, and a method for controlling the operation of this engine, which allow, with extremely simple and low cost means, increasing the combustion propagation speed in the cylinder of the engine, to improve the homogeneity of the air-fuel-EGR charge, and to avoid so-called "wall-wetting" phenomena by the fuel injector, even in the most severe conditions, such as cold starting the engine.

In an alternative, it also falls within the objects of the invention to propose an internal combustion engine of the type indicated above wherein the aforesaid advantages can be combined with a high operating flexibility of the engine thanks to the combined application of a variable drive system of the intake valves of the engine.

SUMMARY OF THE INVENTION

With a view to achieving one or more of the aforesaid objects, the invention relates to an internal combustion engine having the characteristics indicated at the beginning of the present description, and further characterized in that said device for actuating said first intake valve and said second intake valve is configured to control, during the intake stage in each cylinder operating cycle, firstly an opening movement and a subsequent closing movement of only said first intake valve, while the second intake valve remains closed, and subsequently an opening movement and a subsequent closing movement of only said second intake valve, while the first intake valve remains closed, in such a way that the entering into the cylinder at different times of air flows at the same pressure from the two intake ducts produces an increase in turbulent kinetic energy, with consequent advantages for combustion efficiency and reduction of harmful exhaust emissions.

Advantages of the Invention

Studies and experiments by the Applicant have shown that the alternating opening at successive times of the two intake valves of each cylinder of the engine allows, in general:
  obtaining an improvement in the propagation speed of the combustion,
  modulating the intensity of the macro-motions organized inside the combustion chamber, i.e. the so-called swirl motion (flow rotating around the cylinder axis), tumble motion (flow rotating around an axis perpendicular to the cylinder axis), cross-tumble motion (flow rotating around an axis perpendicular to the cylinder axis and perpendicular to the tumble axis), so as to favor the homogeneity of the charge and to reduce wall-impingement phenomena during the fuel injection stage directly in the combustion chamber—gasoline direct injection (GDI).

The aforesaid advantages derive from the fact that the two intake ducts flow into the cylinder in mutually spaced apart positions. In the initial stage of the intake stroke, which begins when the piston is approximately at the Top Dead Center (TDC), only the first intake valve is opened: the air flow introduced into the cylinder through the first intake duct generates a fluid dynamic field including a swirl component, as well as tumble and cross-tumble components. Thanks to the opening of the first valve, a higher intensity field of motion is established (in the ideal case, without viscous dissipations, of double intensity) compared to the case wherein the two intake valves are opened simultaneously: this field of motion of greater intensity is associated both with the formation of high turbulence and with the favorable predisposition of the charge to the direct fuel injection (if envisaged). Said fuel injection, characterized by a single injection or by multiple injections, may begin during the opening of the first valve, or subsequently: thanks to the more intense motion field, and also to the swirl of particular intensity, the homogeneity of the mixture of air, EGR (if present) and fuel will be maximum. Furthermore, especially in the case of cold starting of the engine, when evaporation of the fuel injected into the combustion chamber is more difficult, with a consequent increase in particulate matter (also caused by the more pronounced phenomenon of wall wetting), the interaction of the fuel spray with the generated swirl avoids the impingement of fuel droplets against the walls, with beneficial effects on particulate emissions.

In the second part of the intake stage, wherein the first intake valve is closed, the fuel injection can continue: thanks to the higher intensity motion field present, the optimal air-fuel mixing will take place. Towards the end of the intake stroke, the second intake valve is opened and then closed again; this second delayed opening of the second intake valve has a double effect:

it generates a motion field that contrasts the component of the motion field of the swirl generated by the first opening of the first valve: according to the maximum lift of this second actuation and according to the crank angle at which this second opening begins, the pre-existing swirl is consequently attenuated or even reversed in its rotation direction. This phenomenon is especially required at higher engine loads. In fact, one of the problems associated with a motion field with an intense swirl component consists of the fact that the swirl is not very sensitive to the position of the piston: while the tumble motions are converted into turbulent kinetic energy as the piston gradually moves towards the TDC, the swirl and the kinetic energy associated therewith continue to exist even after the TDC, and cause greater heat dissipation—during combustion—through the walls of the combustion chamber. Unlike turbulent kinetic energy, whose greater intensity is required to increase the propagation speed of combustion, the kinetic energy associated with the swirl is therefore undesirable, and instead the attenuation of the swirl is required, obtained by opening the second valve. Furthermore, the transformation of the swirl into a macro-motion organized with a tumble component (or cross-tumble, but—in any case—around an axis perpendicular to the cylinder axis), allows the transfer of kinetic energy from the swirl to the tumble, with the possibility of conversion into turbulent kinetic energy, useful for increasing the combustion speed when the piston is close to the TDC;

the delayed opening of the second intake valve alone generates a "fresh" amount of turbulence which, while dissipating, causes the overall turbulent kinetic energy content at the TDC to be greater than in the case of simultaneous conventional actuation of the intake valves. The dissipation of the turbulence is proportional to the cube of the intensity of the turbulence itself: generating a lot of turbulence at the beginning of the intake stage involves a significant dissipation of this. A delayed generation of new turbulence allows increasing the amount at the angle of ignition. Ideally, it may be possible to double the turbulent kinetic energy available at the ignition angle, compared to the case of conventional actuation of the intake valves, with evident benefits on the greater stability of combustion and, therefore, on the possibility of increasing, for example, the dilution of the charge.

It should be noted that document FR 3064676 A1 discloses an internal combustion engine with two intake valves for each cylinder, which are opened at subsequent times. The two intake valves are associated with two intake ducts, one receiving compressed air from a turbocharger, and the other receiving air further compressed from an additional compressor located downstream of the turbocharger. The air flow at higher pressure is generated to be introduced into the cylinder during the stroke of the piston towards the TDC. For this reason, the intake valve associated with the intake duct that receives this flow of air at higher pressure is opened after the opening of the other intake valve which, instead, takes place during the stroke of the piston towards the BDC. In other words, according to this prior art, opening the two intake valves of the same cylinder in spaced apart angular ranges of the crankshaft rotation is provided only for the reason that the two intake ducts are supplied with air at different pressures.

The solution known from FR 3064676 A1 involves the following drawbacks:

increase in the cost and complexity of the system, due to the need to provide a pressure booster, and consequently also a unit to cool the air before introduction into the cylinder;

increase in the thermal capacity of the engine, due to the presence of the booster, with a consequent delay in warm-up and a decrease in the efficiency of the catalytic converter, with a consequent worsening of harmful emissions;

lower efficiency due to the energy absorbed by the booster, resulting in the need for greater pumping work of the engine.

Additional Preferred Features

In a first embodiment, the device for actuating the two intake valves associated with the cylinder is of the conventional type. In this case the engine comprises a camshaft for actuating the intake valves, which comprises a first cam for actuating the first intake valve against the action of a return spring, tending to keep the first intake valve closed, and a second cam, for actuating the second intake valve, against the action of a return spring tending to keep the second intake valve closed. In this embodiment, the first cam and the second cam are configured and arranged on the camshaft in such a way that during the intake stage in each cylinder operating cycle, firstly the first cam causes an opening movement and a closing movement only of said first intake valve, while the second intake valve remains closed and, subsequently, the second cam causes an opening movement and a closing movement of only the second intake valve, while the first intake valve remains closed.

In a second embodiment, the engine comprises a variable actuation device of the first intake valve and of the second intake valve, and this variable actuation device is configured to achieve, in different operating conditions of the engine, either the aforesaid operation mode with openings at subsequent times, firstly of only the first intake valve and subsequently only of the second intake valve, or a second conventional mode of operation, with opening of the first intake valve and the second intake valve at crank angles which are identical or relatively close to each other, and closing of the first intake valve and second intake valve at crank angles which are identical or relatively close to each other, or a third operation mode, with opening and closing of only one of the two intake valves, preferably only of said second intake valve.

According to a first example, the variable actuation device may be of the type marketed under the MultiAir trademark and which is the subject of various patents of the Applicant (including EP 0 803 642 B1, EP 1 555 398, EP 1 508 676 B1, EP 1 674 673 B1 e EP 2 261 471 A1, EP 2 693 007 A1, and EP 2 801 706 A1). In this case, the first cam and the second cam control, respectively, the first intake valve and the second intake valve associated with the cylinder by means of respective electronically-controlled hydraulic devices. Each of the two hydraulic devices includes a tappet operated by the respective cam, a master cylinder associated with the tappet for transferring pressurized fluid from a pressurized fluid chamber to a slave cylinder acting as the hydraulic actuator of the respective intake valve, and an electrically-operated control valve, designed to place the pressurized fluid chamber in communication, when it is open, with a low pressure discharge channel, in order to decouple the intake valve from the respective tappet and cause the rapid closure of the intake valve by means of the respective return spring.

In another example, the actuation device of said first intake valve and said second intake valve is a variable actuation device of the known type including multi-profile cams, which can be selectively activated to provide either an operating mode with openings at successive times, initially of the first intake valve only and then of the second intake valve only, or an operating mode with coincident or nearly coincident openings of the first intake valve and of the second intake valve.

In yet another example, the actuation device of said first intake valve and said second intake valve is a variable actuation device including electromagnetic or electro-pneumatic actuators capable of being able to control the opening and closing of each intake valve independently from the crank angle and independently from the motion of the other intake valve.

The studies and tests conducted by the Applicant have also shown that the advantages of the invention multiply with an adequate timing of the two opening cycles of the first intake valve and of the second intake valve.

In one example, the midpoint of the opening stage of the first intake valve lies in the first half of the piston stroke in the cylinder from the TDC to the BDC, while the midpoint of the opening stage of the second intake valve lies in the second half of the intake stroke of the piston in the cylinder from the TDC to the BDC.

In particular, in an example of the invention, the intake valve actuation device is configured in such a way that the first intake valve is opened when the cylinder piston is substantially at the Top Dead Center (TDC), or close to it, and is closed before the piston has reached the Bottom Dead Center (BDC), preferably when the piston is near the middle of the stroke from the TDC to the BDC, while the second intake valve is opened near the BDC, preferably when the piston is already rising towards the TDC, and is closed when the air flow would tend to reverse its direction back towards the intake manifold (which may depend on the pressure in the intake manifold, the speed of rotation of the crankshaft and the engine load).

In this example, during each operating cycle of the cylinder, in the time that elapses between the closing of the first intake valve and the opening of the second intake valve, the piston in the cylinder continues to move towards the BDC generating a vacuum in the cylinder. Consequently, when the second intake valve opens, even if the piston is rising towards the TDC, the vacuum previously generated in the cylinder allows a further charge of air to be drawn from the second intake duct: the higher the vacuum in the cylinder (depending on the closing angle of the first valve), the higher the speed, the flow rate and the turbulence generated in the cylinder by the second opening. The resulting fluid dynamic field is highly turbulent and allows obtaining drastic advantages from the point of view of the propagation speed of the combustion, in particular, allows increasing the dilution of the air-fuel charge with EGR or excess air. Therefore, this embodiment of the invention allows the advantages described above to be multiplied.

In one embodiment, the first and second intake ducts are sized in such a way that, at high engine loads, the closure of the first intake valve generates a pressure wave that rises up the first intake duct and passes through the common intake manifold into the second intake duct, so as to maximize the filling of the cylinder.

In another example, the first and second intake ducts have different diameters and different lengths, chosen in such a way that, in conditions of maximum engine filling and full opening of the second intake valve, the flow of air entering the combustion chamber with the opening of the second intake valve does not cancel the swirl motion of the air flow previously introduced into the combustion chamber with the opening of the first intake valve.

In another example, the actuation device of said first intake valve and said second intake valve is configured to control a lift of the first intake valve that is significantly lower than the lift of the second intake valve, so that the filling of the cylinder is obtained mainly due to the opening of the second intake valve.

The invention also relates to the engine control method.

DETAILED DESCRIPTION OF THE INVENTION

Further characteristics and advantages of the invention will become apparent from the description that follows with reference to the attached drawings, provided purely by way of non-limiting example, wherein:

FIGS. 1, 2 are a perspective view of a plan view of the combustion chamber of a cylinder of an internal combustion engine and of the intake and exhaust ducts associated therewith, FIG. 3 is a perspective view of a conventional type of drive system for the two intake valves associated with the cylinder, FIG. 3A illustrates a variant of FIG. 3, corresponding to a first embodiment example of the invention.

FIGS. 4-9 are diagrams that illustrate various examples of implementation of the opening and closing cycles of the two intake valves associated with each cylinder of an internal combustion engine, according to different embodiments of the invention, compared to a conventional cycle that envisages the opening of both intake valves at the BDC and the closing of both intake valves at the TDC, FIGS. 10A-10E are diagrams illustrating the advantages of the present invention, and FIG. 11 is a variable drive system for the intake valves, of the type known by the name MultiAir, which can be used in an embodiment of the invention.

With reference to FIGS. 1, 2, reference number 2 indicates—in its entirety—the combustion chamber associated with a cylinder 1 of an internal combustion engine of any known type, whose axis is indicated with C1. FIGS. 1, 2 show two intake ducts 3A, 3B, having any known conformation, and opening into the combustion chamber 2 in mutually spaced apart positions. The two ducts 3A, 3B are both in communication with the same intake manifold 30 (shown only partially), and therefore receive air at the same pressure from the air supply line to the engine. In the example shown, the engine is not of the supercharged type, so that the ducts 3A, 3B both receive air at ambient pressure. In the case of a supercharged engine, anyhow the ducts 3A, 3B receive air at the same pressure.

FIGS. 1, 2 also show two exhaust ducts 4A, 4B associated with the cylinder 1 and converging in an exhaust manifold 5 (partially visible in FIG. 2) of the internal combustion engine.

The engine can be of any known type, with controlled ignition or compression ignition. The drawings show only the parts that are relevant for the purposes of the present invention, it being understood that the structure and general configuration of the engine can be made in any known way.

According to the conventional technique, two intake valves of the conventional poppet type, with a stem and a circular head, are associated with the two intake ducts 3A, 3B: a first intake valve VA, and a second intake valve VB.

As will be further illustrated hereinafter, for the purposes of the present invention, the drive system of the intake valves VA, VB can be of any known type. Purely by way of example, FIG. 3 shows an actuating device for the intake valves VA, VB of the conventional type comprising a camshaft 6 rotatably supported in the structure of the cylinder head of the engine and rotated in a conventional manner by means of a transmission device (for example, a toothed belt transmission device) from the crankshaft (not shown) of the internal combustion engine. The camshaft 6, of which only a portion is shown in FIG. 3, comprises two cams 6A, 6B for actuating the first intake valve VA and the second intake valve VB, respectively. In the conventional example illustrated in FIG. 3, the two cams 6A, 6B actuate the two valves VA, VB by means of respective rocker arms 7A, 7B, each of which has an end mounted in an pivoting manner on a support 8 carried by the structure of the cylinder head and the opposite end acting on the respective intake valve.

Again with reference to the first embodiment of the invention which is described here, the cams 6A, 6B are modified in the manner illustrated in FIG. 3A, in order to obtain lift profiles of the type illustrated in any one of FIGS. 4-9.

FIG. 4 shows the lift profiles of the two intake valves VA, VB according to a first embodiment example of the present invention. The diagram in FIG. 4 shows the displacement of each intake valve as a function of the rotation angle of the engine. In the convention adopted here, a rotation angle of the engine equal to 360° corresponds to the condition wherein the piston inside the cylinder is at the TDC. The position of the piston at the BDC corresponds to a crank angle of 540°.

In FIG. 4, the line LC illustrates the lift diagram of the intake valves in the case of a conventional engine, equipped with conventional cams. In the case of the conventional solution, the two intake valves VA, VB are controlled simultaneously and in synchronism according to the profile LC. As can be seen, in the conventional solution, the two valves begin to open immediately before the TDC, they reach the condition of maximum opening around a crank angle close to 470° and are closed again in the vicinity of a crank angle equal to 600°. To obtain this result, the two cams 6A, 6B have an identical profile, such as to generate the lifting profile LC and also have an identical angular position on the camshaft 6, as visible in FIG. 3.

In the embodiment of the invention that is illustrated in FIG. 4, the cams 6A, 6B have different configurations (as in FIG. 3A) and are angularly oriented in a different way on the camshaft 6. The shape and orientation of the two cams 6A, 6B is such as to produce the lift profiles for the intake valves VA, VB indicated, respectively, with LA and LB in FIG. 4 (it should be noted that the lift profiles LA and LB shown in FIG. 4 and beyond are only qualitative)

The first important characteristic to be observed is that during the intake stage in each operating cycle of the cylinder, initially an opening and closing movement of only the first intake valve VA is activated, while the second intake valve VB is kept closed, and subsequently an opening and closing movement of only the second intake valve VB is activated, while the first intake valve VA is kept closed.

FIG. 4 refers to a particularly preferred example of embodiment wherein the first intake valve VA begins to open when the piston in the cylinder is in proximity to the TDC (or is close to it, immediately before or immediately after the TDC), and is then closed first by an crank angle of 540°, i.e. when the piston in the cylinder is still moving in the direction of the BDC, and has not yet reached the BDC. The second intake valve VB is instead opened after the piston in the cylinder has reached the BDC and is already rising towards the TDC (for example, around an crank angle equal to 560°) and is closed after an additional rotation of the crankshaft, for example, equal to about 90°.

Again with reference to FIG. 4, it can be observed that the maximum lift of the first intake valve VA is approximately 80% of what would be the maximum lift of a conventional cycle, wherein the intake valves VA, VB are open and closed simultaneously, according to the conventional lift line LC, while the maximum lift of the second intake valve VB is equal to about ⅜ of the maximum lift of the first intake valve VA (or is also equal to about 30% of the maximum conventional lift according to the profile LC).

FIGS. 5-8 are diagrams similar to that of FIG. 4 illustrating additional embodiment examples of the invention, which differ from the example of FIG. 4 in the shape of the lift profiles (FIGS. 5, 6) or in the timing of the lift profiles (FIGS. 7, 8). As can be seen, in the case of FIGS. 5, 6, the opening and closing times of the intake valves VA, VB substantially correspond to those illustrated in FIG. 4, while in the case of FIG. 7, the second intake valve VA begins to open immediately after the first intake valve VA is closed, while finally in the case of FIG. 8, the second intake valve begins to open immediately before the first intake valve VA is closed.

All the aforesaid embodiments have in common the fact that during the intake stage in the cylinder there is a first period wherein only the first intake valve VA is substantially open, while the second intake valve VB is kept closed, while in a second period only the second intake valve VB is open, while the first intake valve VA remains closed.

Regardless of the timing of the opening and closing cycles of the two intake valves, the aforesaid characteristic allows obtaining the advantage of an increase in Turbulent Kinetic Energy (TKE) in the charge of air introduced into the cylinder. This result is linked to the arrangement of the intake ducts illustrated in FIG. 2, with the intake ducts opening into mutually spaced apart positions on the two sides of the plane 4. Therefore, when air is introduced into the cylinder coming only from the intake duct 3A, the air flow introduced gives rise to a fluid dynamic field with a swirl component (flow rotating around the C1 axis of the cylinder). Then, when the first intake valve VA is closed and the second intake valve VB is opened, the flow coming from the other intake duct 3B interferes with the previously induced fluid dynamic field, increasing its TKE. The increase in turbulent kinetic energy in the cylinder results in an increase in the propagation speed of the combustion once the mixture of air and fuel explodes (following ignition of the spark plug in the case of the gasoline engine or of the compression in the cylinder in the case of a diesel engine).

The aforesaid advantage of increasing the TKE in the air flow introduced into the cylinder is multiplied in the case of the embodiments of FIGS. 4, 5, 6. In this case, in fact, when the first intake valve VA is closed, the piston in the cylinder continues to descend towards the BDC causing a vacuum in the cylinder. In the case of these embodiments, the second intake valve opens after the BDC, i.e. when the piston is already rising again towards the TDC. Nevertheless, the vacuum field previously established in the cylinder means that, also in this stage, the opening of the second intake valve VB causes an energetic entry of air into the cylinder from the second intake duct 3B with the creation of a high TKE in the field dynamic fluid inside the cylinder.

As already indicated above, the invention can be implemented both with an internal combustion engine having a device for actuating the intake valves of a conventional type, wherein the lift profiles of the two intake valves are fixed and predetermined, and in internal combustion engines equipped with variable drive systems of the intake valves.

Thus, for example, with reference to FIG. 6, the cam 6A that causes the opening and closing of the first intake valve VA may be controlled by a device, for example, electro-hydraulic, in such a way as to have a profile such as to cause the lift profile indicated with LA1. In fact, thanks to the decoupling of the motion of the cam from the motion of the intake valve by means of hydraulic means, it is possible to have a law of the motion of the intake valve that is not monotonous. However, the same variable drive system can be used to vary the lift profile of the valve VA, for example, according to the profile LA2. Similarly, the actuation device, combined with the cam 6B, may generate a law of the motion according to the lift profile LB1 illustrated in FIG. 6. However, the engine may be equipped with a variable drive system that allows an effective lift of the valve VB to be obtained according to the profile LB2.

In one example, the invention is applied to an internal combustion engine equipped with a variable drive system for the intake valves of the engine of the type developed by the same Applicant and marketed under the MultiAir brand.

FIG. 11 schematically shows an example of the Multiair variable drive system. In this case, each of the intake valves VA, VB (FIG. 11 shows the device associated with the valve VA) is operated by the respective cam 6A or 6B by means of an electronically-controlled hydraulic device 8. The cam 6 actuates a tappet 9 kept in contact with the cam 6 by a return spring 10. The tappet 9 is associated with the pumping piston 11 of a master cylinder, which transfers pressurized fluid of a chamber 12 to the chamber of a slave cylinder 13 whose piston 14 acts as an actuator of the intake valve VA. The intake valve VA is drawn back by a spring 15 towards a closing position of the intake duct 3A. All of the aforesaid components are carried by the structure 16 of the cylinder head of the engine. A solenoid valve 17 is controlled by an electronic control unit E. When the solenoid valve is in a closed condition, it interrupts the communication between the pressurized fluid chamber 12 and a low pressure environment 18, communicating with a fluid accumulator 19 and with an inlet 20 intended to be in communication with the engine lubrication circuit. If the solenoid valve 17 is in the closed condition, the pressurized fluid chamber 12 is isolated, so that the movements of the tappet 9 imparted by the cam 6 can be transferred, by means of the fluid in the chamber 12 and the slave cylinder 13 to the intake valve VA. In a condition wherein the cam 6 is keeping the intake valve VA open, an opening of the solenoid valve 17 controlled by the electronic control unit E causes the discharge of the pressurized fluid chamber 12 and the consequent closure of the intake valve VA due to the return spring 15. In this condition, the intake valve VA is insensitive to the movements of the tappet 9 imparted by the cam 6.

This description is provided here purely as an indication of the fundamental operating principle of the Multiair system. The Applicant has developed various embodiments of this system, which have been the subject of various patent publications including those already mentioned above.

It is understood that the invention would also be usable in combination with variable drive systems of the intake valves of any known type, such as, for example, electromagnetic drive systems, or variable drive systems, for example, of the type comprising multi-profile cams.

In the case of adopting a variable drive system, it is possible that the operating mode described above, with an actuation at successive times of initially only the first intake valve and then only the second intake valve, is implemented only under certain conditions of the engine operation, while in other engine operating conditions the two intake valves of each cylinder are controlled in a conventional way, causing them to open and close simultaneously.

Figure 7:
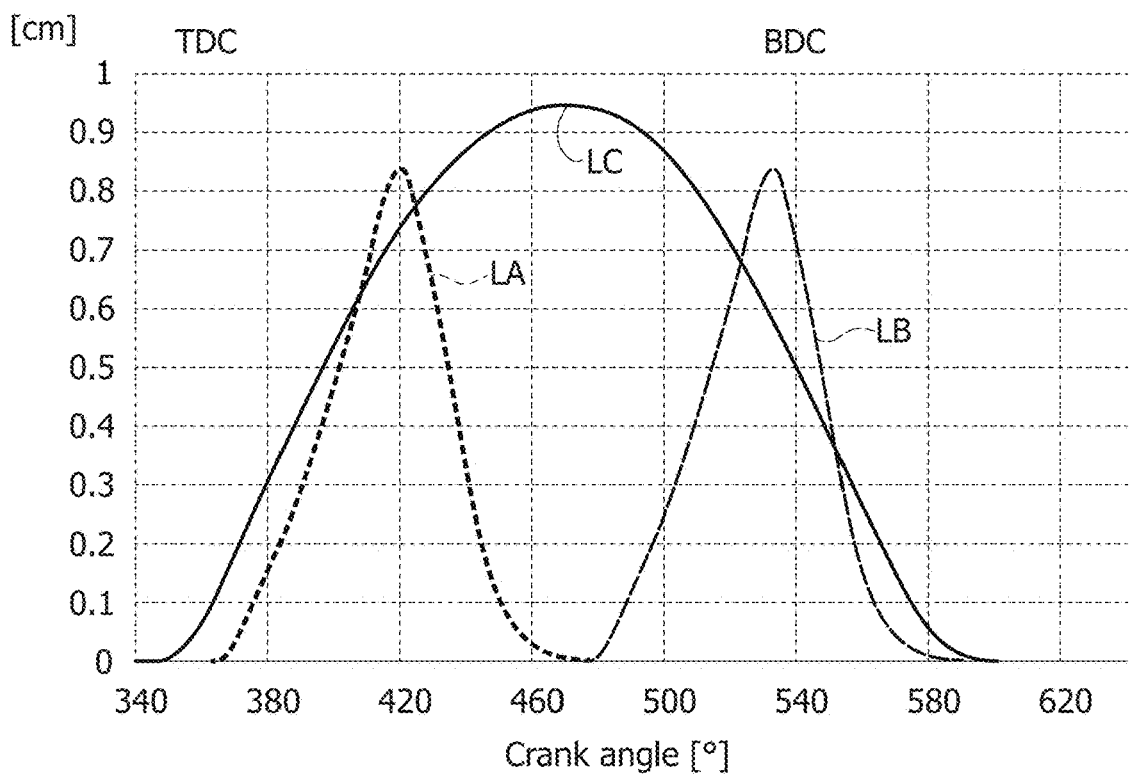
Figure 8:
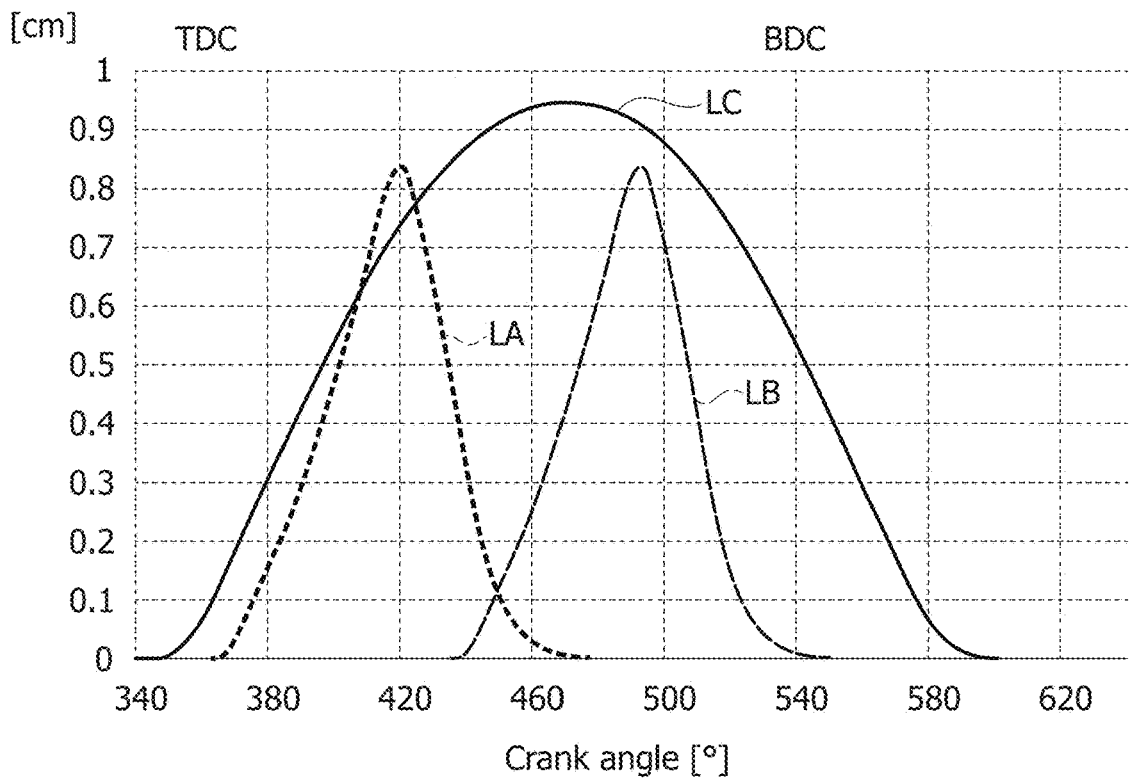
Figure 9:
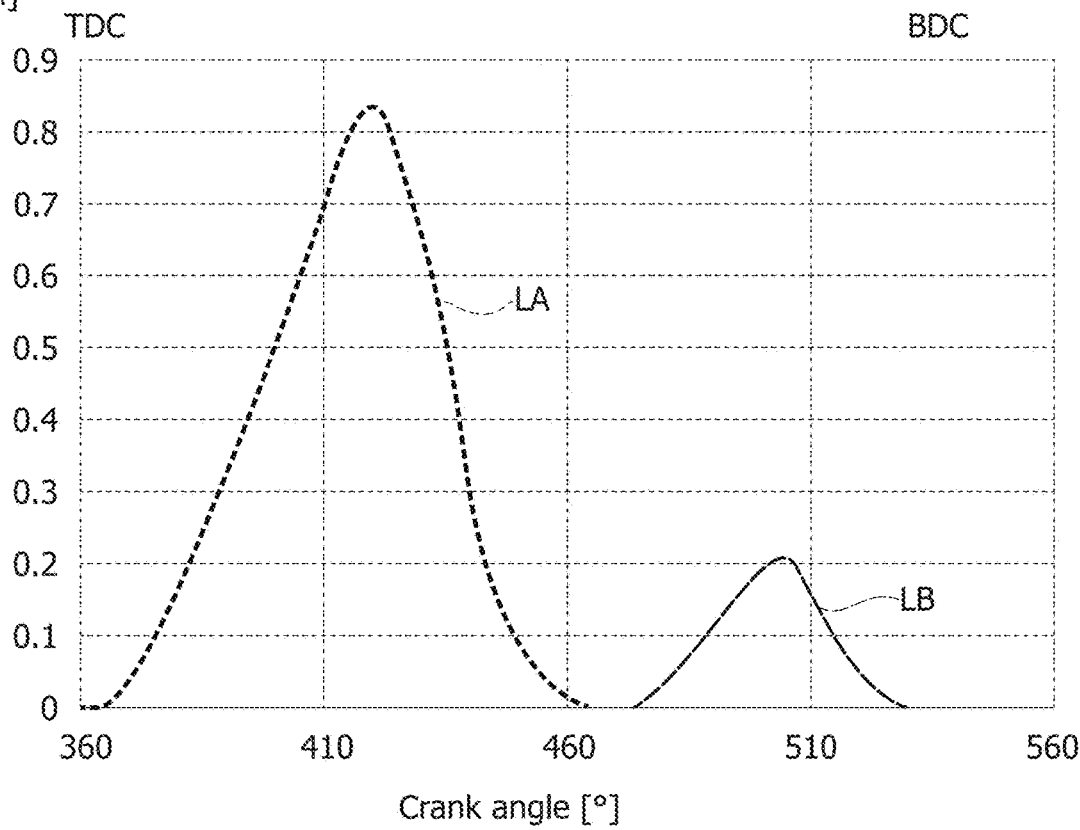
FIG. 9 illustrates another example of the lift diagrams of the two intake valves, in a variant of the invention.
Figure 10A:
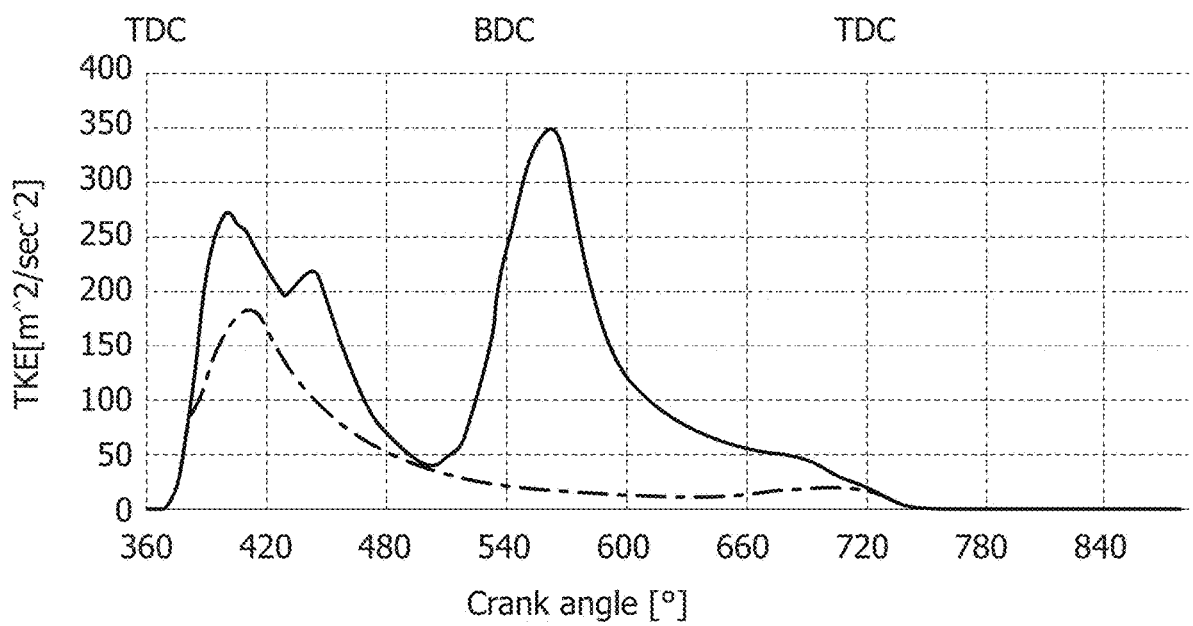
FIGS. 10A-10E show the main benefits obtainable with the invention compared to a conventional standard implementation wherein both intake valves open at the TDC and close at the BDC.

FIG. 10A is a diagram showing the variation of the average value of turbulent kinetic energy (TKE) in the combustion chamber in the case of standard implementation and in the case of an embodiment of the invention corresponding to the qualitative diagram of FIG. 7. The diagram of FIG. 10A shows how the delayed opening of the second intake valve generates a new increase in the turbulent kinetic energy in the vicinity of the BDC, so that, although dissipating, at the next TDC the value of TKE is considerably higher than the standard case.

Figure 1:
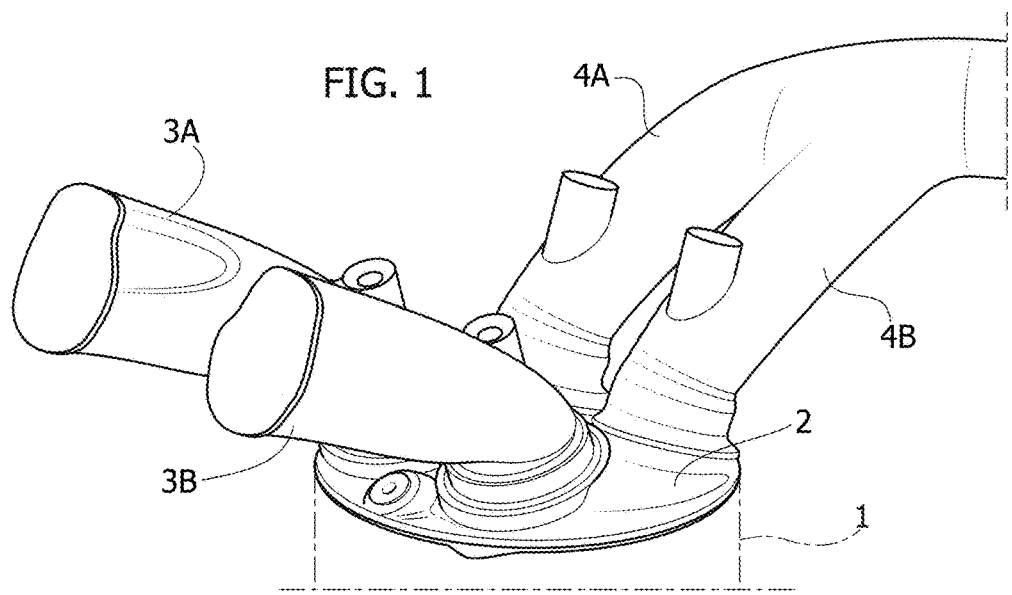
Figure 2:
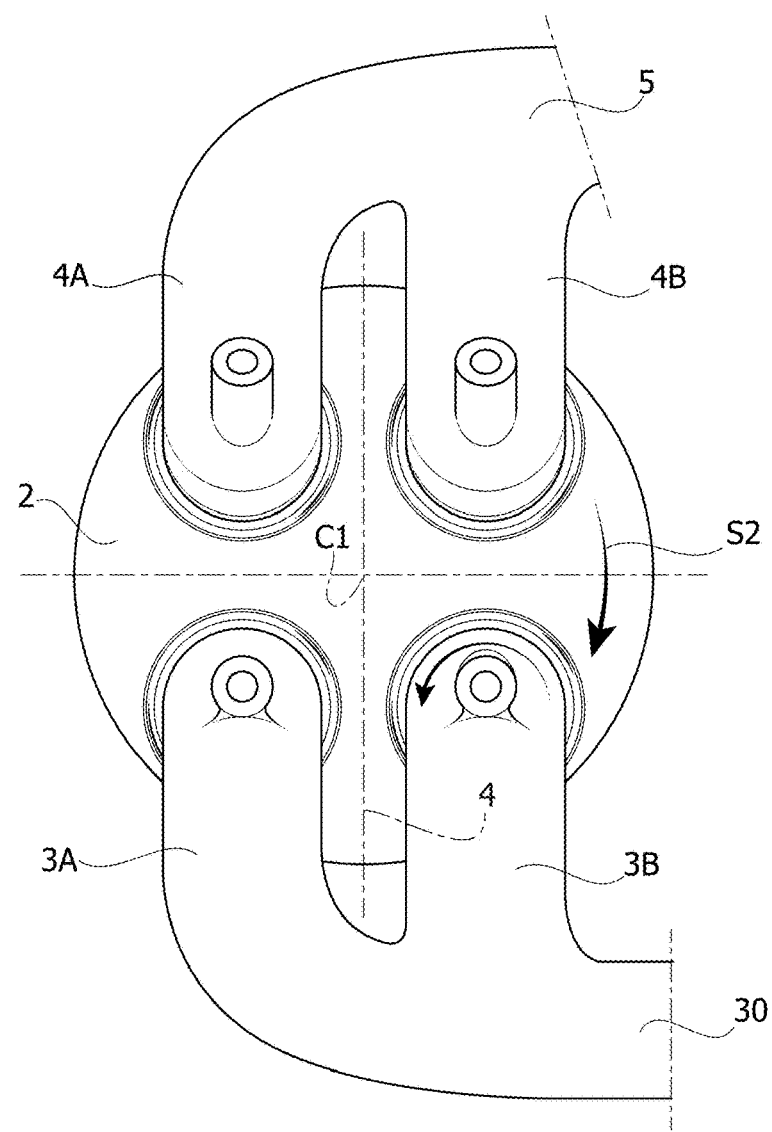
Figure 5:
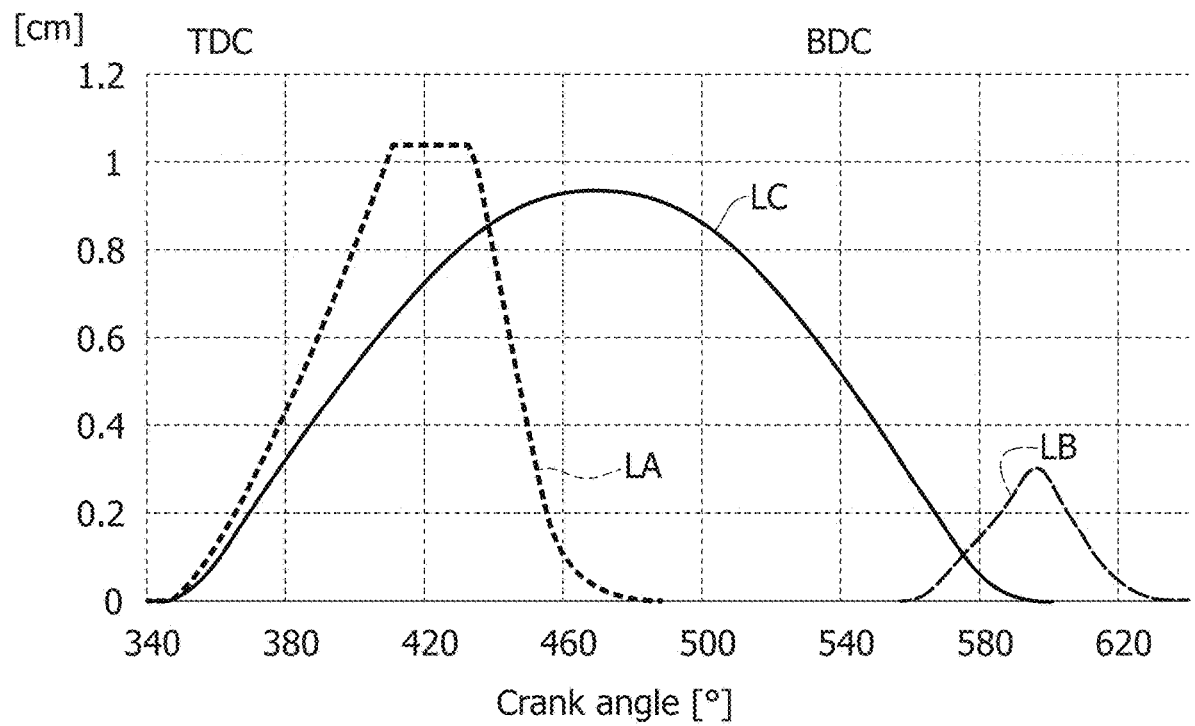
Figure 6:
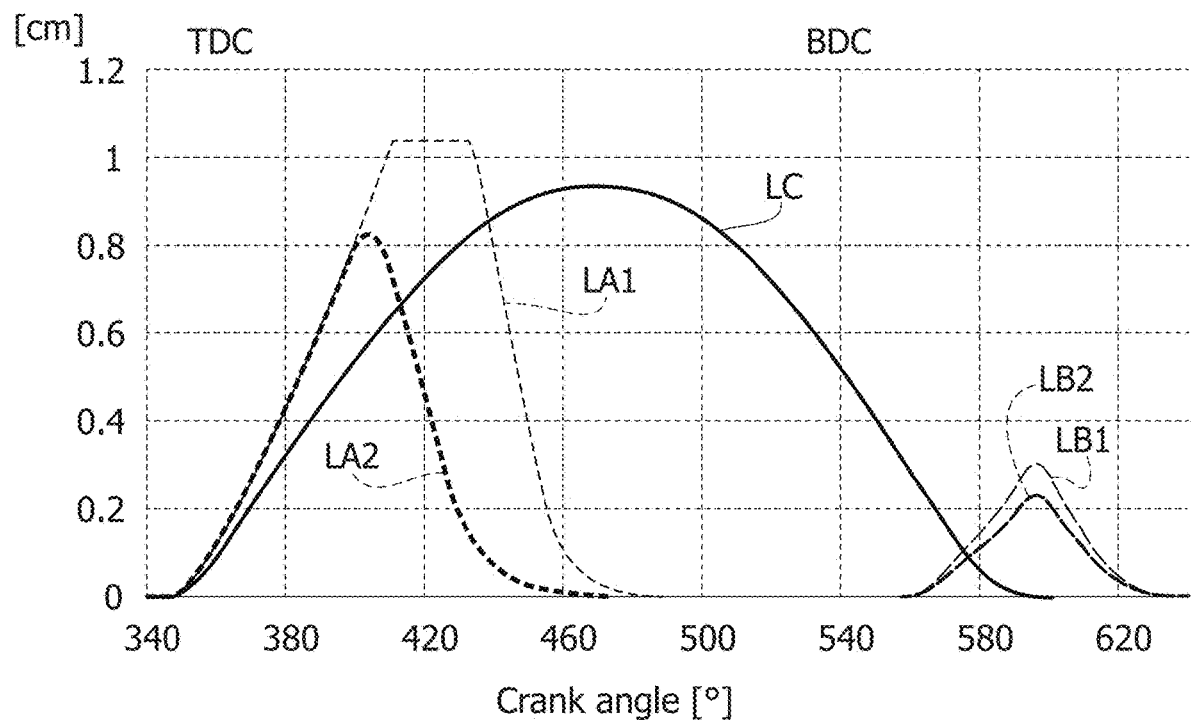
Figure 10B:
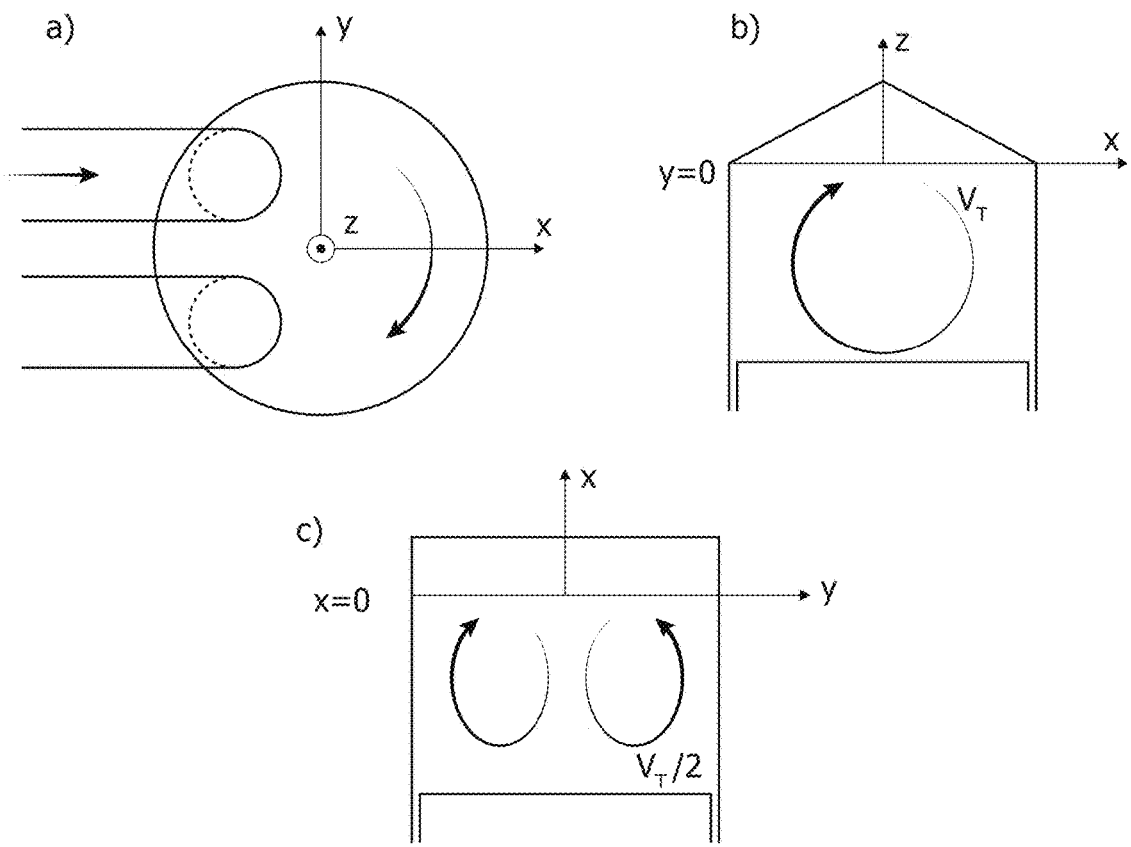

FIGS. 10B a, b and c schematically illustrate the different organized macro-motions that take place in the combustion chamber. These figures show a reference system wherein the X axis lies in the plane of symmetry of the intake valve ducts (plane 4 in FIG. 2) and is concordant with the introduction of air into the combustion chamber. Tumble motion is, therefore, defined as that which lies in planes normal to the Y versor; a cross-tumble motion is defined as that which lies in planes normal to the X versor. Swirl is defined as that which lies in planes normal to the Z versor. The so-called tumble, cross-tumble and swirl indices are defined as follows:

$$\text{Tumble Index} = \omega_{Tumble}/\omega_{Engine}$$

$$\text{Cross Tumble Index} = \omega_{CrossTumble}/\omega_{Engine}$$

$$\text{Swirl Index} = \omega_{Swirl}/\omega_{Engine}$$

where $\omega_{Engine}$ is the rotation speed of the engine, $\omega_{Tumble}$, $\omega_{CrossTumble}$ and $\omega_{Swirl}$ are the average angular velocities of the respective motions [rad/sec].

Figure 10C:
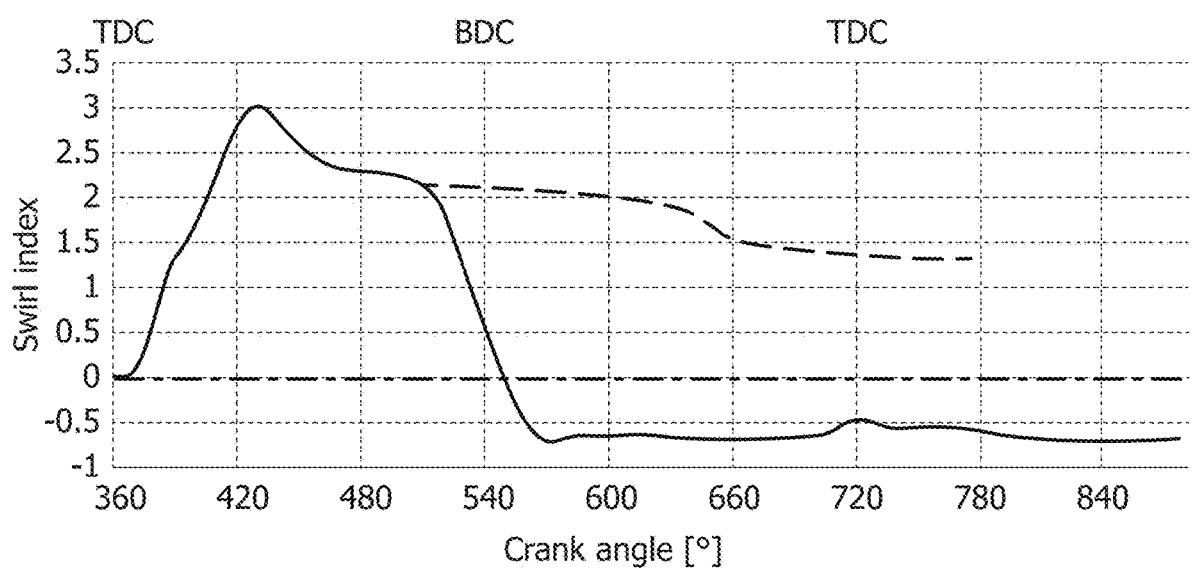

FIG. 10C shows the effect of the opening of the second intake valve on the swirl generated by the preceding opening movement of the first intake valve: the dashed line refers to the trend that the swirl index would have in the case wherein after the opening cycle of the first intake valve no opening of the second intake valve occurs. It is noted that the intensity of the swirl would also be considerable during combustion, with an increase in heat exchanges and a worsening of engine efficiency. The solid line shows the advantages of the invention for the swirl: as soon as the second intake valve opens, the swirl is reduced proportionally to the air introduced during the opening of the second intake valve. It can be deduced that, by having an actuation device of the intake valves capable of varying the profile of the opening movement of the second intake valve, it is possible to modulate the intensity of the swirl present in the chamber during combustion. The dashed/dotted line refers to the standard actuation which, obviously, does not envisage the formation of swirl.

Figure 10D:
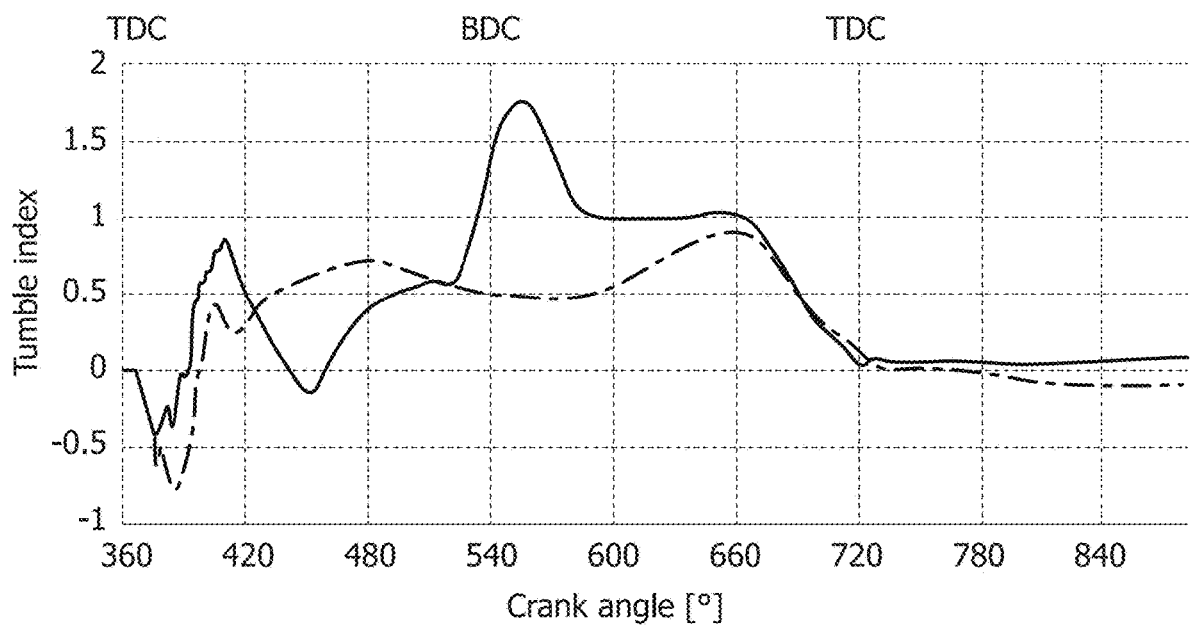

FIG. 10D shows the effect of the opening of the second intake valve on the tumble generated by the preceding opening cycle of the first intake valve: it should be noted that, at the beginning of the opening of the second intake valve (which, in this example occurs at a crank angle of 500°), there is a significant increase in the tumble index, against a sudden reduction in the swirl index (visible in FIG. 10C). In a similar way to the standard case, starting from the crank angle of 660°, due to the motion of the piston that compresses the tumble, the tumble index decreases to zero, with associated conversion of kinetic energy into turbulent kinetic energy: see also FIG. 10A: when the crank angle is from 660° to 700° there is no further dissipation of TKE as the dissipation is replaced by that generated by cancellation of the Tumble.

Figure 10E:
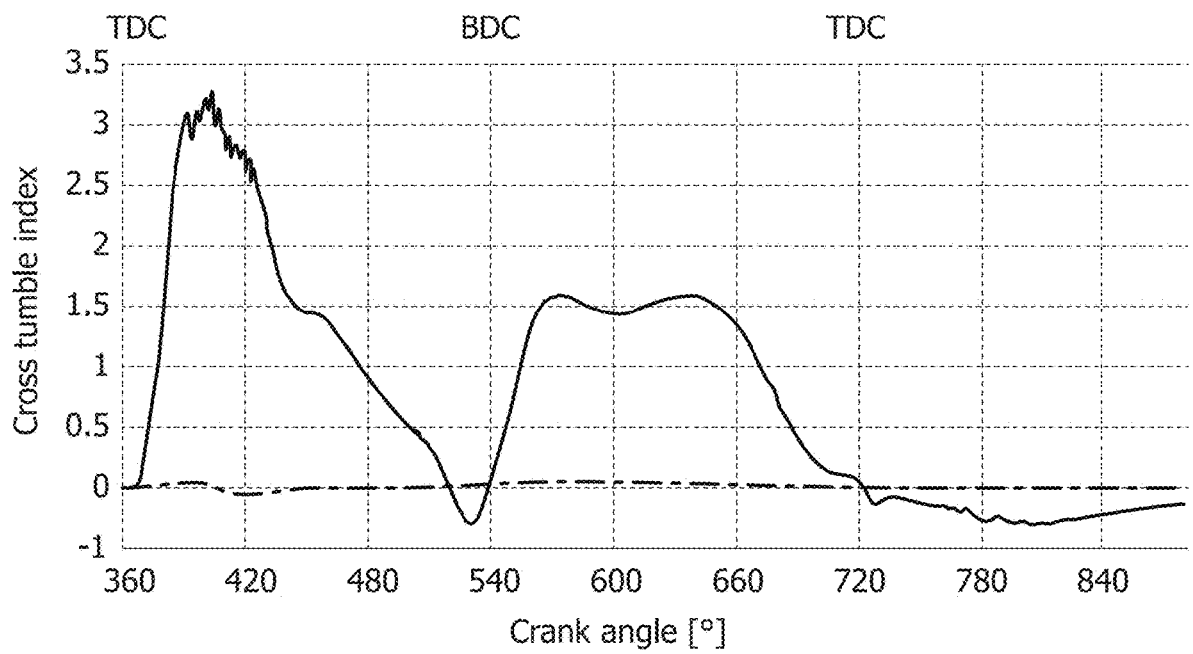
Figure 11:
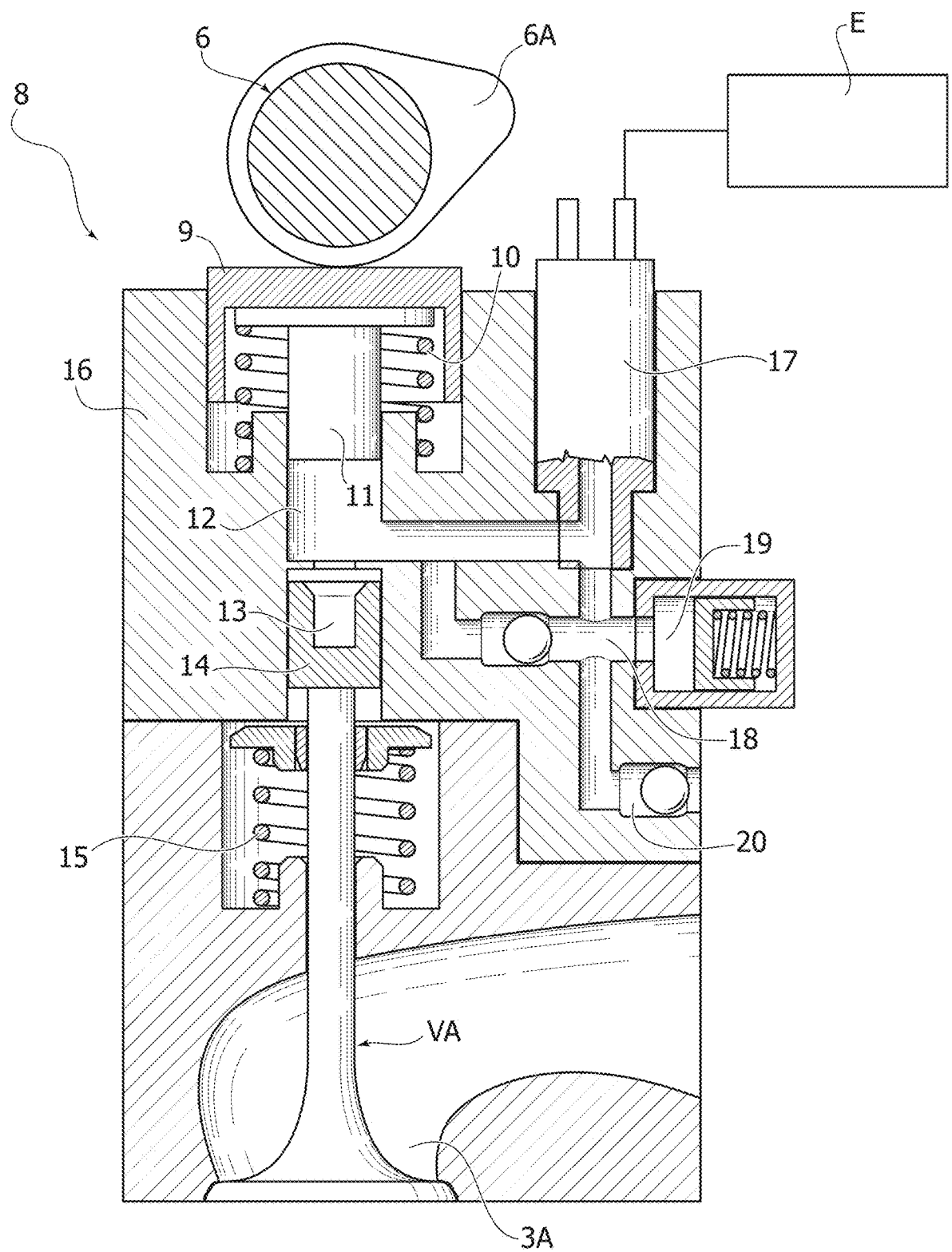

FIG. 10E shows the trend of the Cross Tumble index: similarly to the swirl (FIG. 10C), this motion is not present in the case of standard actuation. And similarly to the case of the tumble motion (FIG. 10D), the cross-tumble motion is enlivened at the opening of the second intake valve following the opening movement of the first intake valve, due to the transformation of the swirl motion. Similarly to the case of the Tumble motion, the cross tumble motion also helps to support the TKE in the range between 660° and 700° of the crank angle.

In conclusion, it is understood how the modularity of the swirl affects the other organized motions: it is therefore possible to optimize the need for an optimal air-fuel mixing with the required TKE value at TDC, by varying the parameters that define the two subsequent actuations of the first intake valve and the second intake valve.

In one embodiment, the first and second intake ducts are sized in such a way that—at high engine loads—the closure of the first intake valve generates a pressure wave that rises up the first intake duct and passes through the common intake manifold into the second intake duct, so as to maximize the filling of the cylinder.

In another example, the first and second intake ducts have different diameters and different lengths, chosen in such a way that, in conditions of maximum engine filling and full opening of the second intake valve, the flow of air entering the combustion chamber with the opening of the second intake valve does not cancel the swirl motion of the air flow previously introduced into the combustion chamber with the opening of the first intake valve.

In another example, the actuation device of said first intake valve and said second intake valve is configured to control a lift of the first intake valve that is significantly lower than the lift of the second intake valve, so that the filling of the cylinder is obtained mainly thanks to the opening of the second intake valve.

Naturally, without prejudice to the principle of the invention, the embodiments and construction details may widely vary with respect to those described and illustrated purely by way of example, without thereby departing from the scope of the present invention, as defined in the attached claims.

What is claimed is:

1. An internal combustion engine, comprising one or more cylinders and respective pistons sliding in the cylinders between a top dead center and a bottom dead center and operatively connected to a crankshaft, said engine being configured to carry out a sequence of intake, compression, expansion and discharge stages during each operating cycle in each cylinder, wherein the engine comprises, for each cylinder:
a first intake duct and a second intake duct opening into the cylinder in spaced apart positions and both communicating with a same intake manifold, so as to receive air at a same pressure,
a first intake valve and a second intake valve associated with the cylinder, to control entering into the cylinder of a flow of intake air from the first intake duct and the second intake duct, respectively, during an intake stage in each operating cycle of the cylinder, and
a device for actuating said first intake valve and said second intake valve, to control, during the intake stage in each operating cycle of the cylinder, an opening movement and a subsequent closing movement of said first intake valve and said second intake valve,
said actuation device of said first intake valve and said second intake valve configured to control, during the intake stage in each cylinder operating cycle, firstly an opening movement and a subsequent closing movement of only said first intake valve, while the second intake valve remains closed, and subsequently an opening movement and a subsequent closing movement of only said second intake valve, while the first intake valve remains closed,
in such a way that the entering into the cylinder at different times of the air flows from the two intake ducts communicating with the same intake manifold, produces an increase in turbulent kinetic energy.

2. An internal combustion engine according to claim 1, wherein said engine comprises a camshaft for actuating said intake valves comprising:
a first cam, for actuating said first intake valve, against an action of a return spring tending to keep the first intake valve closed, and
a second cam, for actuating said second intake valve, against an action of a return spring tending to keep the second intake valve closed, said first cam and said second cam are configured and arranged on said camshaft in such a way that during each intake stage, the first cam initially causes an opening and subsequent closing movement of said first intake valve, while the second intake valve remains closed and, subsequently, the second cam causes an opening and subsequent closing movement of said second intake valve, while the first intake valve remains closed.

3. An internal combustion engine according to claim 1, further comprising a variable actuation device of the first intake valve and of the second intake valve, said variable actuation device configured to create, in different operating conditions of the engine,
  either a first operating mode with opening at subsequent times firstly only of the first intake valve and subsequently only of the second intake valve,
  or a second operating mode with opening of the first intake valve and the second intake valve at crank angles which are identical or relatively close to each other, and closing of the first intake valve and the second intake valve at crank angles which are identical or relatively close to each other,
  or a third operating mode, with opening and closing of only one of the two intake valves, preferably only of said second intake valve.

4. An internal combustion engine according to claim 3, wherein the first operating mode is implemented if the engine speed is less than 3000 rpm.

5. An internal combustion engine according to claim 2, wherein the first cam and the second cam control the first intake valve and the second intake valve, respectively, by means of respective electronically-controlled hydraulic devices, each of said hydraulic devices including:
  a tappet operated by the respective cam,
  a master cylinder associated with the tappet for transferring pressurized fluid from a pressurized fluid chamber to a slave cylinder acting as the hydraulic actuator of the respective intake valve,
  at least one electrically-operated control valve configured to place in communication, when open, said pressurized fluid chamber with a low pressure discharge channel in order to uncouple the intake valve from the respective tappet and cause the closing of the intake valve by effect of the respective return spring,
  the electrically-operated control valve of each of the aforesaid hydraulic devices being controlled by an electronic control unit, which is configured and programmed to actuate an operating mode only in one or more predetermined operating conditions of the engine in which, during each intake stage, firstly an opening movement and a subsequent closing movement of only said first intake valve is carried out, while the second intake valve remains closed and, subsequently, an opening movement and a subsequent closing movement of only said second intake valve is carried out, while the first intake valve remains closed.

6. An engine according to claim 1, wherein the median point of the opening stage of the first intake valve lies in the first half of the intake stroke of the piston from the top dead center to the bottom dead center, while the median point of the opening stage of the second intake valve lies in the second half of the intake stroke of the piston from the top dead center to the bottom dead center.

7. An internal combustion engine according to claim 1, wherein said actuating device of the intake valves is configured in such a way that during the intake stage in each operating cycle of the cylinder, the first intake valve is opened when the piston in the cylinder is substantially at the top dead center, and is closed before the piston has reached the bottom dead center, while the second intake valve is opened after the piston has reached the bottom dead center and is moving up towards the top dead center, and is closed after another rotation of the crankshaft, as soon as the air flow entering through the intake duct controlled by the second intake valve tends to reverse its direction and leave the cylinder through the same intake duct.

8. An internal combustion engine according to claim 1, wherein the actuation device of said first intake valve and of said second intake valve is a variable actuation device including electromagnetic or electro-pneumatic actuators.

9. An internal combustion engine according to claim 3, wherein the actuation device of said first intake valve and of said second intake valve is a variable actuation device of the type including cams with a plurality of profiles, which can be selectively activated to create either an operating mode with openings of the first intake valve and the second intake valve at subsequent times, or an operating mode with substantially coincident opening of the first intake valve and the second intake valve.

10. An internal combustion engine according to claim 1, wherein:
  the two intake ducts have different configurations, and/or
  the first intake valve and the second intake valve are poppet-type valves, with a circular head and a stem, and have heads with different diameters.

11. An internal combustion engine according to claim 1, wherein the first intake valve and the second intake valve are poppet-type valves, with a circular head and a stem, and in that a maximum lift of the first intake valve is greater than D/5, where D is the diameter of the head of said first intake valve.

12. An engine according to claim 1, wherein the first and second intake ducts are sized in such a way that the closing of the first intake valve generates a pressure wave that rises up the first intake duct and passes into the second intake duct, so as to maximize filling of the cylinder.

13. An engine according to claim 1, wherein the first and second intake ducts have different diameters and different lengths, chosen in such a way that, in conditions of maximum filling of the engine and full opening of the second intake valve, the flow of air entering a combustion chamber with the opening of the second intake valve does not cancel the swirl motion of the air flow previously introduced into the combustion chamber with the opening of the first intake valve.

14. An engine according to claim 1, wherein the actuation device of said first intake valve and said second intake valve is configured to control a lift of the first intake valve, which lift is lower than a lift of the second intake valve, so that the filling of the cylinder is obtained mainly thanks to the opening of the second intake valve.

15. A method for controlling the operation of an internal combustion engine, which comprises one or more cylinders and respective pistons sliding in the cylinders between a top dead center and a bottom dead center and operatively connected to a crankshaft, wherein in each cylinder during each operating cycle subsequent intake, compression, expansion and discharge stages are carried out,
  wherein the engine comprises, for each cylinder:
    a first intake duct and a second intake duct opening into the cylinder in spaced apart positions and both communicating with a same intake manifold, so as to receive air at the same pressure, a first intake valve and a second intake valve associated with the cylinder, to control the entry into the cylinder of a flow of intake air from the first intake duct and the second intake duct, respectively, during an intake stage in each operating cycle of the cylinder, and a device for actuating said first intake valve and said second intake valve, to control, during the intake stage in each operating cycle of the cylinder, an opening movement and a subsequent closing movement of said first intake valve and said second intake valve, controlling, by means of said actuation device of said first intake valve and said second intake valve, during the intake stage in each cylinder operating cycle, firstly an opening and subsequent closing movement of only said first intake valve, while the second intake valve remains closed and subsequently an opening and subsequent closing movement of only said second intake valve, while the first intake valve remains closed, in such a way that the entering into the cylinder at different times of the air flows from the two intake ducts communicating with the same intake manifold, produces an increase in turbulent kinetic energy.

16. A method according to claim 15, wherein the first intake valve is opened when the piston in the cylinder is substantially at the top dead center and is closed before the piston has reached the bottom dead center, while the second intake valve is opened after the piston has reached the bottom dead center and is already rising towards the top dead center, and is closed after an additional rotation of the crankshaft.

17. A method according to claim 15, wherein the engine comprises a variable actuation device of the first intake valve and of the second intake valve, and that said variable actuation device is controlled to create, in different operating conditions of the engine, either a first operating mode with opening at subsequent times of the first intake valve and the second intake valve, or a second operating mode with opening of the first intake valve and second intake valve at crank angles which are identical or relatively close to each other, and closing of the first intake valve and second intake valve at crank angles which are identical or relatively close to each other, or a third mode of operation, with opening and closing of only one of the two intake valves, preferably only of said second intake valve.

18. A method according to claim 17, wherein the first operating mode is implemented if the engine speed is less than 3000 rpm.

19. A method according to claim 15, wherein the first and second intake ducts are sized in such a way that at high engine loads, the closure of the first intake valve generates a pressure wave that rises up the first intake duct and passes into the second intake duct, so as to maximize the filling of the cylinder.

20. A method according to claim 15, wherein the first and second intake ducts have different diameters and different lengths, chosen in such a way that, in conditions of maximum engine filling and full opening of the second intake valve, the flow of air entering a combustion chamber with the opening of the second intake valve does not cancel the swirl motion of the air flow previously introduced into the combustion chamber with the opening of the first intake valve.

21. A method according to claim 15, wherein the actuation device of said first intake valve and said second intake valve is configured to control a lift of the first intake valve which lift is significantly lower than a lift of the second intake valve, so that the filling of the cylinder is obtained mainly due to the opening of the second intake valve.

* * * * *